(12) United States Patent
Jung et al.

(10) Patent No.: US 8,059,600 B2
(45) Date of Patent: Nov. 15, 2011

(54) METHOD AND APPARATUS FOR TRANSMITTING AND RECEIVING SIGNAL IN A COMMUNICATION SYSTEM

(75) Inventors: Young-Ho Jung, Suwon-si (KR); Sung-Hyun Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 996 days.

(21) Appl. No.: 11/943,123

(22) Filed: Nov. 20, 2007

(65) Prior Publication Data

US 2008/0123591 A1 May 29, 2008

(30) Foreign Application Priority Data

Nov. 20, 2006 (KR) .................. 10-2006-0114773

(51) Int. Cl.
*H04W 4/00* (2009.01)
*H04W 36/00* (2009.01)
*H04B 7/216* (2006.01)

(52) U.S. Cl. ......... 370/331; 370/338; 370/342; 455/439

(58) Field of Classification Search .................. None
See application file for complete search history.

(56) References Cited

U.S. PATENT DOCUMENTS

| | | | |
|---|---|---|---|
| 6,128,490 A * | 10/2000 | Shaheen et al. | 455/434 |
| 6,591,103 B1 * | 7/2003 | Dunn et al. | 455/436 |
| 6,600,917 B1 * | 7/2003 | Maupin | 455/414.1 |
| 7,388,929 B2 | 6/2008 | Roy | |
| 7,756,150 B2 * | 7/2010 | Yang | 370/420 |
| 2003/0032451 A1 * | 2/2003 | Hu | 455/560 |
| 2003/0119454 A1 * | 6/2003 | Hattori | 455/73 |
| 2004/0009770 A1 * | 1/2004 | Sivanandan et al. | 455/425 |
| 2004/0063426 A1 * | 4/2004 | Hunkeler | 455/426.1 |
| 2004/0166892 A1 * | 8/2004 | Iizuka | 455/550.1 |
| 2005/0107085 A1 * | 5/2005 | Ozluturk | 455/439 |
| 2005/0202823 A1 * | 9/2005 | Shaheen et al. | 455/436 |
| 2006/0029066 A1 | 2/2006 | Jeong et al. | |
| 2006/0251020 A1 * | 11/2006 | Olvera-Hernandez et al. | 370/331 |
| 2007/0008929 A1 * | 1/2007 | Lee et al. | 370/331 |
| 2007/0025246 A1 * | 2/2007 | Pirzada et al. | 370/230 |
| 2008/0113684 A1 | 5/2008 | Jung et al. | |

FOREIGN PATENT DOCUMENTS

| | | |
|---|---|---|
| KR | 1020060013923 | 2/2006 |
| KR | 1020060048921 | 5/2006 |
| KR | 1020080044018 | 5/2008 |
| WO | WO 2005/089249 | 9/2005 |

* cited by examiner

*Primary Examiner* — Steven H Nguyen
(74) *Attorney, Agent, or Firm* — The Farrell Law Firm, P.C.

(57) ABSTRACT

An apparatus for transmitting and receiving a signal in a communication system supporting multiple communication service modes is provided. The signal transmission apparatus includes a reference signal generator for generating a reference signal for each of a first communication service mode for covering the entire service area of a cell and at least one second communication service mode for covering a partial area of the first communication service mode. The signal reception apparatus includes a reference signal receiver for receiving, from a Base Station (BS), a reference signal for each of a first communication service mode for covering the entire service area of a corresponding cell and at least one second communication service mode for covering a partial area of the first communication service mode, and a broadcast channel receiver for receiving broadcast channel information from a broadcast channel of the first communication service mode.

13 Claims, 7 Drawing Sheets

| BASE STATION 1 | BASE STATION 2 | BASE STATION 3 | | BASE STATION M | |
|---|---|---|---|---|---|
| SERVICE MODE 1 | Sequence 1 | SERVICE MODE 1 | Sequence N+1 | SERVICE MODE 1 | Sequence 2N+1 |
| SERVICE MODE 2 | Sequence 2 | SERVICE MODE 2 | Sequence N+2 | SERVICE MODE 2 | Sequence 2N+2 |
| ... | ... | ... | ... | ... | ... |
| SERVICE MODE N | Sequence N | SERVICE MODE N | Sequence 2N | SERVICE MODE N | Sequence 3N |

⋮

| BASE STATION M | |
|---|---|
| SERVICE MODE 1 | Sequence (M−1)N+1 |
| SERVICE MODE 2 | Sequence (M−1)N+2 |
| ... | ... |
| SERVICE MODE N | Sequence MN |

FIG.7

METHOD AND APPARATUS FOR TRANSMITTING AND RECEIVING SIGNAL IN A COMMUNICATION SYSTEM

This application claims priority under 35 U.S.C. §119(a) to a Korean Patent Application filed in the Korean Intellectual Property Office on Nov. 20, 2006 and assigned Serial No. 2006-114773, the disclosure of which is incorporated herein by reference.

BACKGROUND OF THE INVENTION

1. Field of the Invention

The present invention generally relates to a method and apparatus for transmitting and receiving signals in a communication system supporting multiple communication service modes.

2. Description of the Related Art

The conventional single radio communication system provides only one communication service mode specialized for its own situation, and has a Base Station (BS) that provides the corresponding communication service mode using a single Radio Access Technology (RAT). In the single radio communication system, users can receive more than two of the services such as Wireless Local Area Network (WLAN), $2^{nd}$ generation Code Division Multiple Access (CDMA), Wireless Broadband Internet (WiBro), Wideband CDMA (W-CDMA), etc. in the same area. For selection of the services, each user basically selects the service determined to be favorable according to the situation. In this case, because the selected service is serviced by different service providers that provide different services independently, the user, to use more than two services, should purchase separate terminals that support their own corresponding services, or should have a multi-mode terminal that supports more than two services, and this makes the seamless service switching impossible.

SUMMARY OF THE INVENTION

An aspect of the present invention is to solve at least the above problems and/or disadvantages and to provide at least the advantages described below. Accordingly, an aspect of the present invention is to provide a signal transmission/reception method and apparatus for allowing a corresponding terminal to select a communication service mode being always best for the channel condition and its desired service, and a Base Station (BS) providing the service in a single communication system in which multiple communication service modes are provided.

According to one aspect of the present invention, an apparatus for transmitting a signal in a communication system supporting multiple communication service modes is provided. The signal transmission apparatus includes a reference signal generator for generating a reference signal for each of a first communication service mode for covering the entire service area of a cell and at least one second communication service mode for covering a partial area of the first communication service mode.

According to another aspect of the present invention, an apparatus for receiving a signal of a BS providing multiple communication service modes in a communication system is provided. The signal reception apparatus includes a reference signal receiver for receiving, from the BS, a reference signal for each of a first communication service mode for covering the entire service area of a corresponding cell and at least one second communication service mode for covering a partial area of the first communication service mode and a broadcast channel receiver for receiving broadcast channel information from a broadcast channel of the first communication service mode.

According to further another aspect of the present invention, a method for transmitting a signal in a communication system supporting multiple communication service modes is provided. The signal transmission method includes generating a reference signal for each of a first communication service mode for covering the entire service area of a cell and at least one second communication service mode for covering a partial area of the first communication service mode.

According to yet another aspect of the present invention, a method for receiving a signal of a BS providing multiple communication service modes in a communication system is provided. The signal reception method includes receiving, from the BS, a reference signal for each of a first communication service mode for covering the entire service area of a corresponding cell and at least one second communication service mode for covering a partial area of the first communication service mode and receiving, from a broadcast channel of the first communication service mode, broadcast channel information including information on a combination of a BS, from which each user terminal can receive a service in a current position, and a communication service mode, and information on a combination of a BS of an adjacent cell and a communication service mode.

BRIEF DESCRIPTION OF THE DRAWINGS

The above and other aspects, features and advantages of the present invention will become more apparent from the following detailed description when taken in conjunction with the accompanying drawings in which:

FIG. 7 illustrates an exemplary table in which sequences of reference signals for communication service modes are allocated for BSs according to a second embodiment of the present invention.

DETAILED DESCRIPTION OF THE PREFERRED EMBODIMENTS

Figure 1:
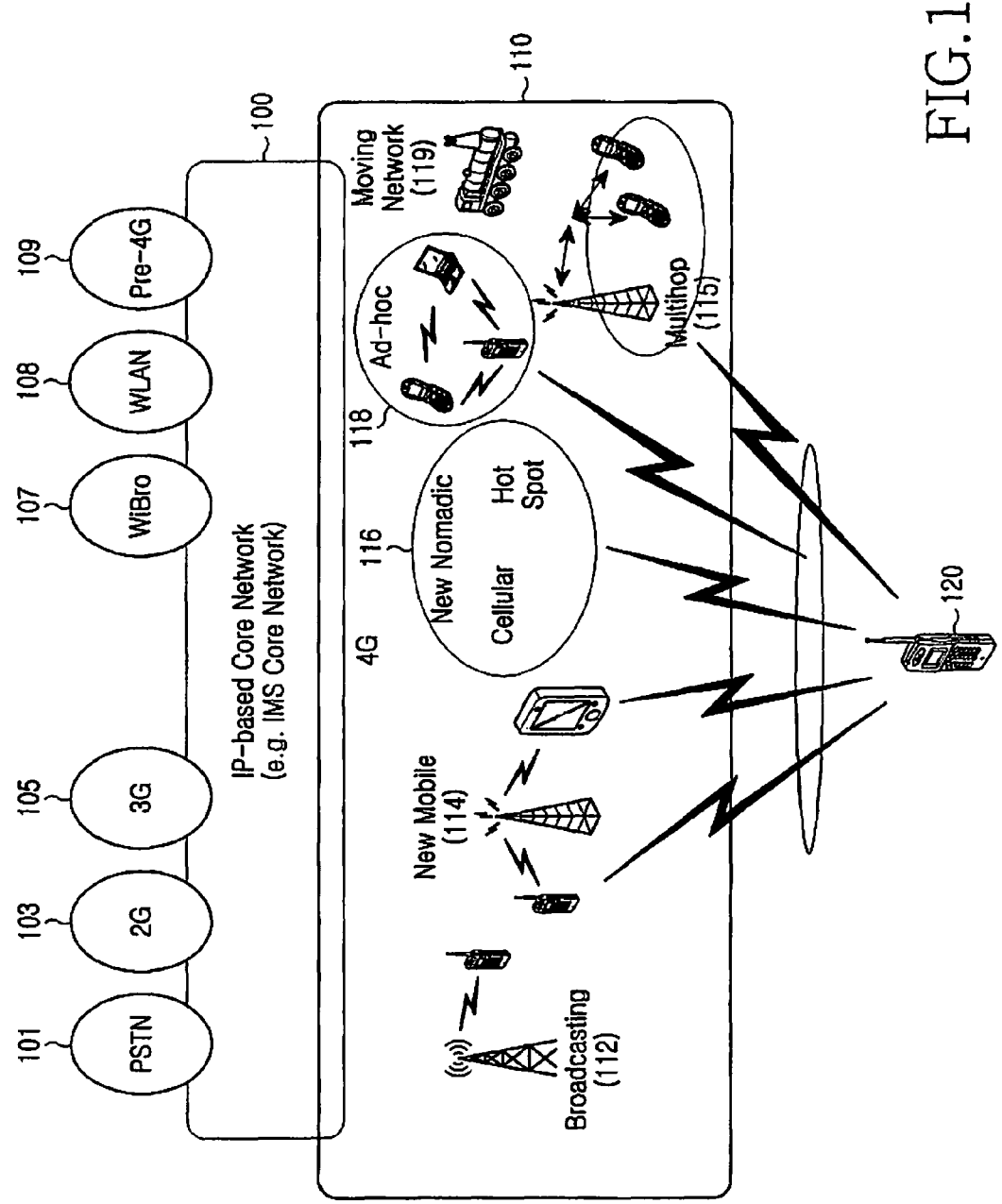
FIG. 1 illustrates a configuration of a communication system providing multiple communication service modes according to the present invention.

The present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

FIG. 1 illustrates a configuration of a communication system providing multiple communication service modes according to a preferred embodiment of the present invention.

Referring to FIG. 1, a core network 100 in the communication system supports multiple Internet Protocol (IP)-based communication service modes. The communication service modes include communication systems for providing a single communication service mode, such as Public Switched Telephone Network (PSTN) 101, $2^{nd}$ Generation (2G) 103, $3^{rd}$ Generation (3G) 105, Wireless Broadband Internet (WiBro) 107, Wireless Local Area Network (WLAN) 108, Pre-$4^{th}$ Generation (Pre-4G) 109, etc.

A user terminal (or Mobile Station (MS)) 120 can effectively receive multiple communication service modes by means of various means supporting a 4G service system 110. The various means for supporting the 4G service include Broadcasting 112, New Mobile 114, New Nomadic 116 (or hot spot communication mode in the low-speed moving environment), Multi-hop 115, Ad-hoc 118 and Moving Network 119.

It is assumed herein that the single radio communication system has multiple communication service modes optimized for each user and multiple Radio Access Technologies (RATs) specialized for each of the communication service modes in the environment where multiple communication service modes are supported. In this case, each Base Station (BS) can service more than two communication service modes, and the 'serving BS'—'communication service mode' combinations separately provided for the corresponding BSs can be all different.

The adaptive radio access communication system concept for providing the best services from a user's standpoint while adaptively changing the multiple RATs as described above is fully taken into consideration after the post-3G mobile communication system in European WINNER Project (https://www.ist-winner.org/).

Figure 2:
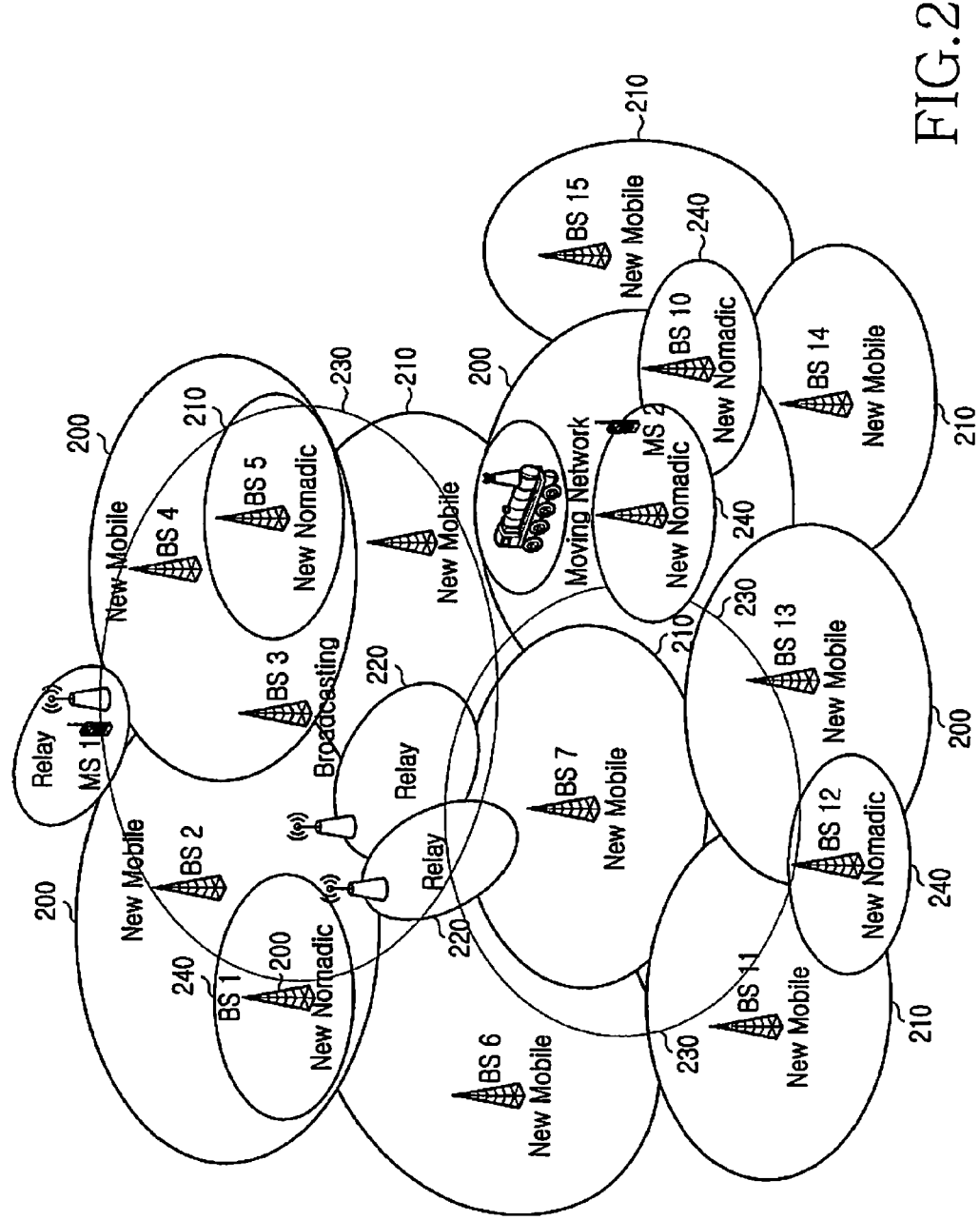
FIG. 2 illustrates the cell arrangement concept of a mobile communication system according to the present invention.

FIG. 2 illustrates the cell arrangement concept of a mobile communication system according to a preferred embodiment of the present invention.

Referring to FIG. 2, consideration can be given to the situation where there is an anchor communication service mode (or anchor service mode) for covering the entire service area, as one of the schemes for realizing the adaptive radio access communication system, and the remaining communication service modes provide services in the form of an island cell corresponding to a part of the anchor communication service mode. The anchor communication service mode considers the situation corresponding to New Mobile 200. That is, the service can be provided from at least one BS that provides a communication service mode of New Mobile 200, in all service areas.

The remaining communication service modes include Relay 220, Broadcasting 230, New Nomadic 240, and Moving Network.

In the environment where multiple communication service modes are provided as illustrated in FIG. 2, it is ideal to provide the best combination of Always Best Serviced (ABS) and Always Best Connected (ABC) from a terminal's standpoint. However, no detailed method for this has been proposed.

Therefore, the present invention provides a scheme for providing means capable of estimating a best 'serving BS'—'communication service mode' combination for each terminal in the situation where there is an anchor communication service mode.

Specifically, the present invention includes the following apparatus for providing each terminal with information on a combination of a BS from which it can receive a service in the current position and a communication service mode, and with means capable of estimating expected performance of each combination, in an adaptive radio access communication system where an anchor communication service mode for covering the entire service area and the remaining communication service mode in the island form for servicing a partial area of the anchor communication service mode are provided.

The apparatus includes a transmission apparatus and a reception apparatus. The transmission apparatus transmits a frame including a reference signal and a broadcast signal for the anchor communication service mode and each of the remaining communication service modes. The reception apparatus by which a terminal receives the reference signals and the broadcast signals and finds a best 'serving BS'—'communication service mode' combination.

Although the present invention will be described herein with reference to the communication service modes each of which basically provides services with separated frequencies, by way of example, it is not intended to limit the scope of the present invention thereto. In addition, it is assumed that a terminal, initially entering the network, considers a reference signal generation scheme for the situation where the anchor communication service mode is necessarily provided.

Figure 3:
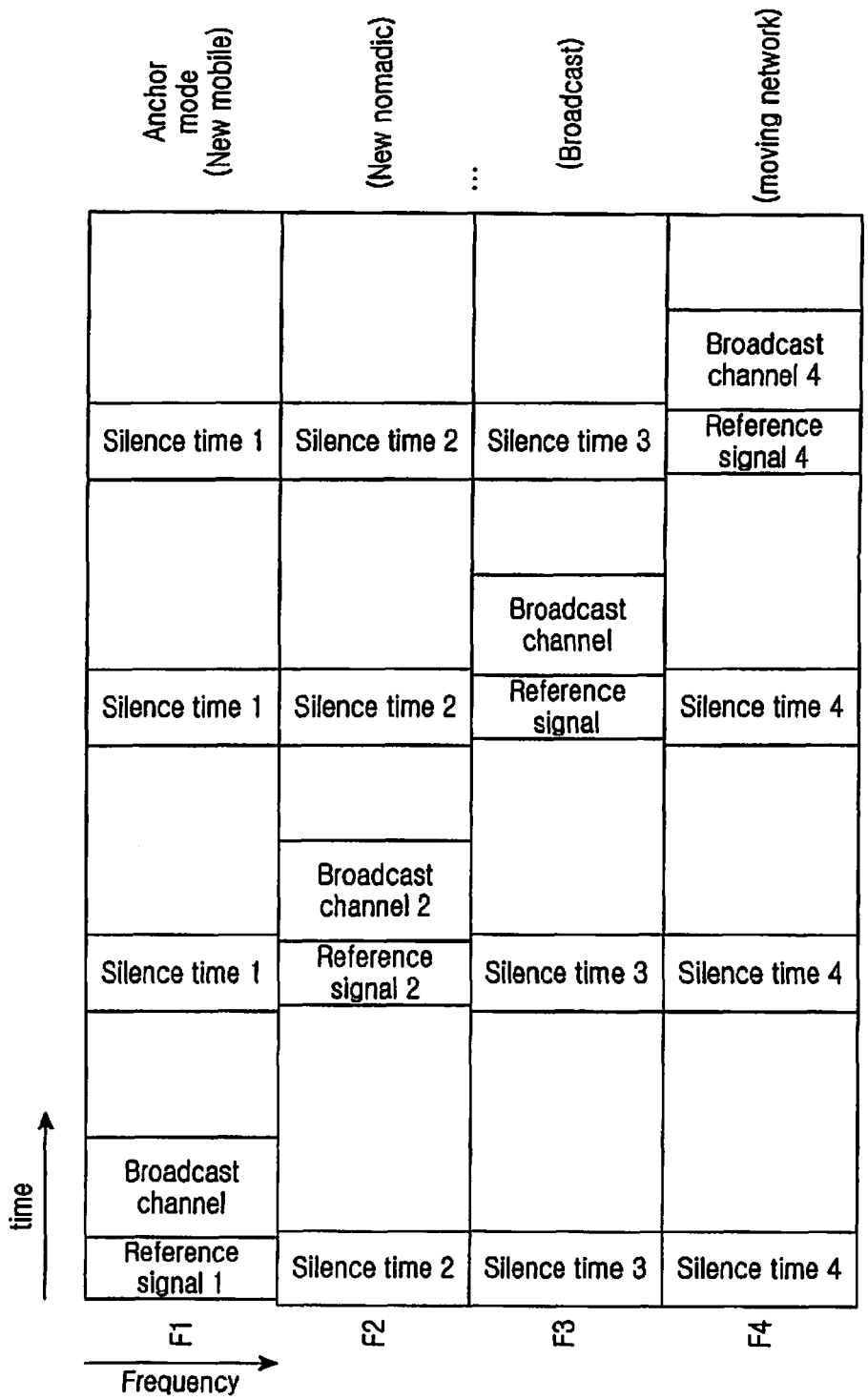
FIG. 3 illustrates an exemplary design of preferred reference signal and broadcast channel for selection of a best 'serving BS'—'communication service mode' combination according to a first embodiment of the present invention.

FIG. 3 illustrates an exemplary design of preferred reference signal and broadcast channel for enabling a search for a best 'serving BS'—'communication service mode' combination according to a first embodiment of the present invention.

Referring to FIG. 3, New Mobile mode is serviced in a frequency band #1 (F1), New Nomadic is serviced in a frequency band #2 (F2), Broadcasting (Broadcast service) is serviced in a frequency band #3 (F3), and Moving Network is serviced with a frequency band #4 (F4). That is, the communication service modes are separately serviced with their corresponding frequency regions.

A short silence time is inserted in a process of communicating a reference signal in a particular communication service mode by differentiating a reference signal transmission time for each communication service mode, so a corresponding terminal receives a reference signal of another communication service mode for the silence time interval. In this case, a Broadcast Channel (BCH) of the anchor service mode should be provided with information on a position of the silence time interval based on information about a combination of other communication service modes provided by the corresponding BS, and a combination of communication service modes of an adjacent cell.

The silence time interval is uniformly provided for each frequency band, making it possible to make a performance comparison between communication service modes of an adjacent BS that provides a service using the corresponding frequency band. The silence time interval, rather than meaning the null interval in which all signals are transmitted on a fully empty basis, means an interval in which the data and control information that the user searching the corresponding frame for the best 'serving BS'—'communication service mode' combination should receive should not undergo scheduling.

For generation of a reference signal for each communication service mode, transmitted by each BS, each BS can be allocated one sequence and reuse the same value for each communication service mode, or each BS can be allocated multiple sequences and use different values for each of the corresponding communication service modes.

Figure 4:
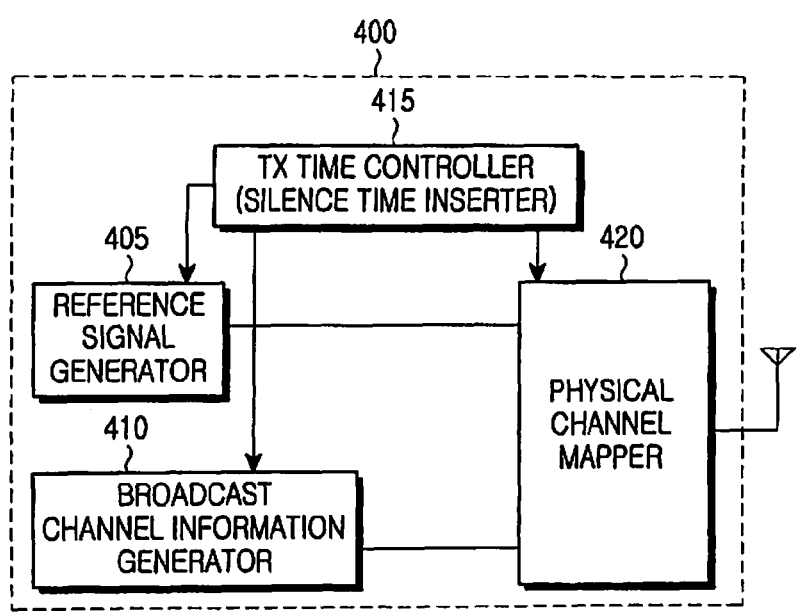
FIG. 4 illustrates a structure of a BS according to the first embodiment of the present invention.

FIG. 4 illustrates a structure of a BS according to the first embodiment of the present invention.

Referring to FIG. 4, a BS 400 includes a reference signal generator 405, a broadcast channel information generator 410, a transmission time controller (or silence time inserter) 415, and a physical channel mapper 420.

The reference signal generator 405 generates a reference signal for an anchor communication service mode and a reference signal for each communication service mode provided by the BS 400, and transfers them to the physical channel mapper 420. The reference signals, before being transferred, are multiplied by a transmission power adjust coefficient which is proportional to the cell radius of the corresponding communication service mode. As stated above, each BS can be allocated one sequence and reuse the same value for each communication service mode, or each BS can be allocated multiple sequences and use different values for each of the corresponding communication service modes.

The broadcast channel information generator 410 generates broadcast channel information, and transfers it to the physical channel mapper 420. The broadcast channel information includes (i) information on other communication service modes provided by a BS that services the anchor communication service mode, (ii) frequency arrangement information, and (iii) position information of a silence time interval for transmitting the reference signal and the broadcast channel information.

The transmission time controller 415 controls timing of the physical channel mapper 420 for transmitting the reference signal and the broadcast channel information to the corresponding terminal. That is, the transmission time controller 415 differentiates a reference signal transmission time for the anchor communication service mode and each of the remaining communication service modes, and then inserts a short silence time in a process of performing communication in a particular communication service mode, so the terminal can receive a reference signal of another communication service mode. The silence time interval is uniformly provided for each communication service mode, making it possible to make a performance comparison between adjacent BSs that provide the corresponding communication service modes. The silence time interval, rather than meaning the null interval in which all signals are transmitted on a fully empty basis, means an interval in which the data and control information that the user searching for the best 'serving BS'—'communication service mode' combination should receive should not undergo scheduling.

The physical channel mapper 420, under the control of the transmission time controller 415, generates a transmission signal by multiplexing the reference signal and the broadcast channel information in the silence time interval for each corresponding communication service mode.

Figure 5:
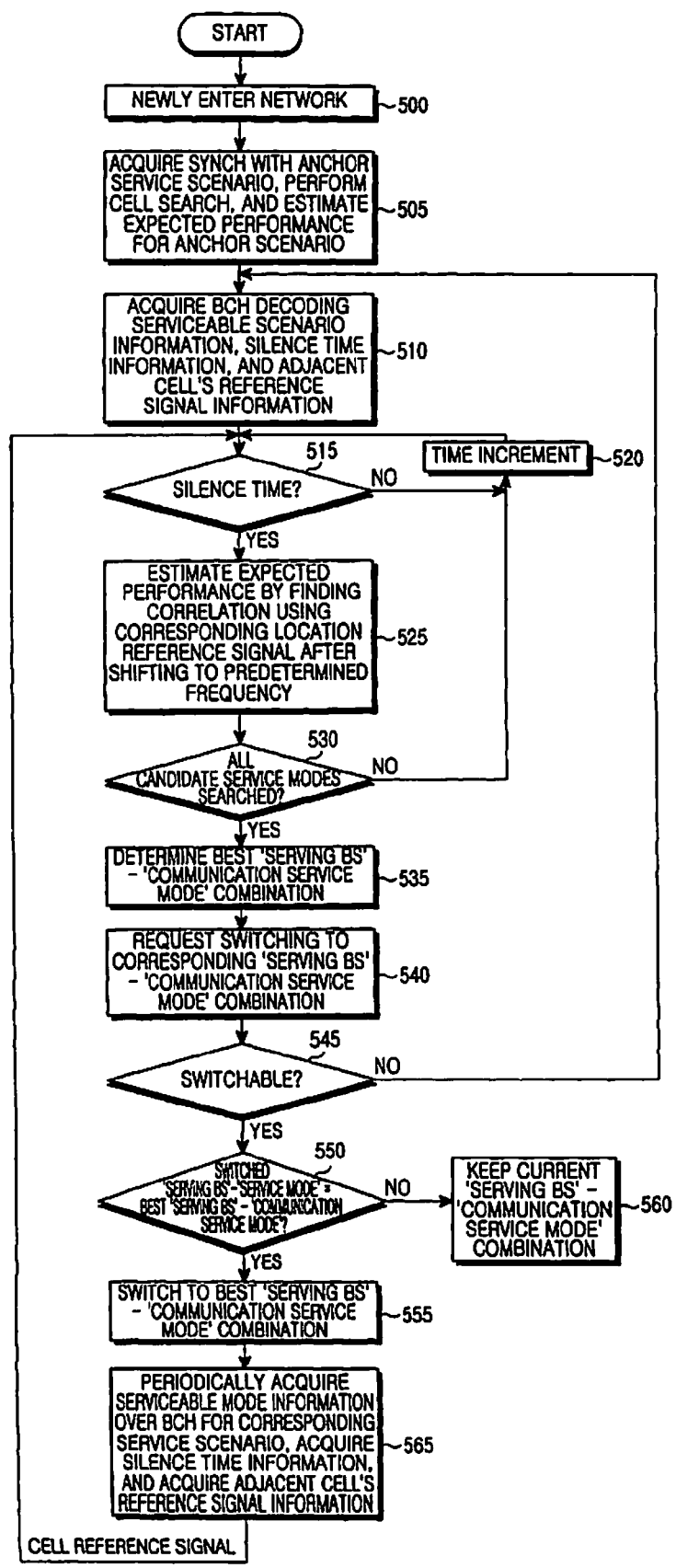
FIG. 5 illustrates a terminal's operation of finding a best 'serving BS'—'communication service mode' combination according to the first embodiment of the present invention.

FIG. 5 illustrates a terminal's operation of finding a best 'serving BS'—'communication service mode' combination according to the first embodiment of the present invention.

Referring to FIG. 5, after newly entering a network in step 500, a user terminal acquires synchronization with an anchor communication service mode of the network and performs cell search in step 505.

In step 510, the terminal performs decoding for a connection with a broadcast channel, and when it is connected, receives broadcast channel information from the broadcast channel. The broadcast channel information includes information on the communication service modes where the current service is available, silence time information of the corresponding communication service mode, and reference signal information of an adjacent cell.

In step 515, the terminal determines if the current interval is a silence time. When it is determined that the current interval is not a silence time, the terminal returns back to step 515 after waiting for the silence time in step 520. When it is determined that the current interval is a silence time, the terminal shifts, in step 525, to the frequency allocated to the corresponding communication service mode, receives a reference signal of the corresponding frequency, and estimates expected performance. Here, for every BS, the reference signal can be either a different value for each corresponding communication service mode, or the same value regardless of the corresponding communication service mode.

In step 530, the terminal determines if all candidate communication service modes have been searched. When it is determined that all candidate communication service modes have not been searched, the terminal returns to step 520 and searches the remaining communication service modes.

When it is determined that all candidate communication service modes have been searched, the terminal determines in step 535 a best combination of a 'serving BS' and a 'communication service mode'. The determination of the best 'serving BS'—'communication service mode' combination in step 535 is made in two steps. In a first step, the terminal selects the best BS for each communication service mode, and estimates the expected performance. In a second step, the terminal searches for a best combination of the serving BS among the selected best BSs for each of the communication service modes and the communication service mode, and the second step undergoes the following detailed process. The terminal receives the estimated Signal-to-Noise Ratios (SNRs) for each of the communication service modes, and determines the best 'serving BS'—'communication service mode' combination according to a communication service mode decision criterion for each user, using Equation (1).

$$[ID_{opt_u}, mode_{opt_u}] = arg_{i,m} \max f_u(SNR_{i,m}, R_u, S_u, v_u, C_u) \quad (1)$$

Herein, $ID_{opt_u}$ and $mode_{opt_u}$ denote a cell ID of the best combination of a 'serving BS' and a 'communication service mode' for a $u^{th}$ user, respectively, and $f_u(\ )$ denotes a decision criterion function for the $u^{th}$ user, with the items in ( ) used as factors. In addition, $SNR_{i,m}$ denotes a received SNR of a preamble corresponding to an $m^{th}$ communication service mode with an $i^{th}$ Cell ID, $R_u$ denotes a requested rate of the $u^{th}$ user, $S_u$ denotes a requested service type of the $u^{th}$ user, $v_u$ denotes a moving velocity of the $u^{th}$ user, and $C_u$ denotes a charge table for each communication service mode of the $u^{th}$ user.

After determining the best combination of the 'serving BS' and the 'communication service mode', the terminal requests switching to the corresponding combination of the serving BS and the communication service mode in step 540. The terminal determines in step 545 if the switching request to the corresponding 'serving BS'—'communication service mode' combination is acceptable. When it is determined that the switching request is unacceptable, the terminal returns to step 510.

When it is determined that the switching request is acceptable, the terminal determines in step 550 if the switched 'serving BS'—'communication service mode' combination is the best 'serving BS'—'communication service mode' combination. When it is determined that the switched 'serving BS'—'communication service mode' combination is the best 'serving BS'—'communication service mode' combination, the terminal switches to the determined best 'serving BS'—'communication service mode' combination in step 555. When it is determined that the switched 'serving BS'—'communication service mode' combination is not the best 'serving BS'—'communication service mode' combination, the terminal keeps the current 'serving BS'—'communication service mode' combination in step 560.

In step 565, the terminal acquires service mode information being periodically serviceable over a broadcast channel of the corresponding communication service mode, silence time information, and reference signal information of an adjacent cell, and then returns to step 515.

Figure 6:
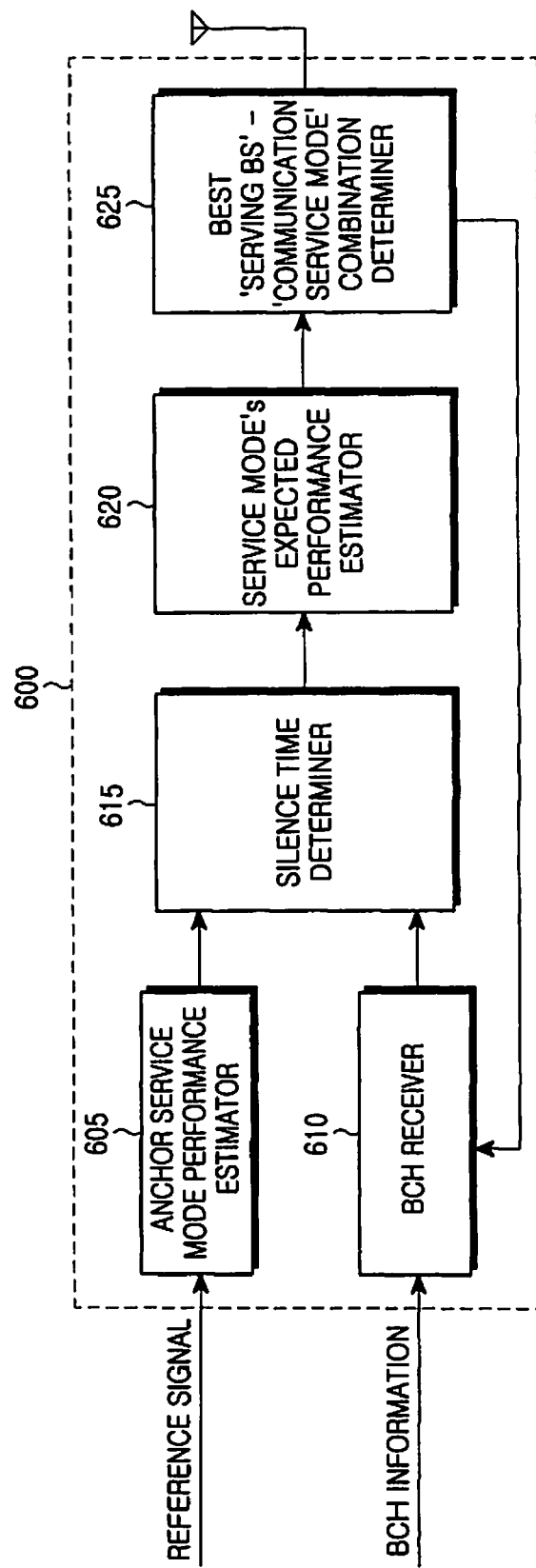
FIG. 6 illustrates a structure of a terminal according to the first embodiment of the present invention.

FIG. 6 illustrates a structure of a terminal according to the first embodiment of the present invention.

Referring to FIG. 6, a terminal 600 includes an anchor service mode performance estimator 605, a broadcast channel receiver 610, a silence time determiner 615, a communication service mode's expected performance estimator 620, and a best 'serving BS'—'communication service mode' combination determiner 625.

When the user terminal 600 enters a network, the anchor service mode performance estimator 605 acquires synchronization with an anchor communication service mode of the network, and performs cell search.

The broadcast channel receiver 610 performs decoding for a connection with a broadcast channel to connect it, and receives broadcast channel information from the broadcast channel. The broadcast channel information includes information on the communication service modes where the current service is available, silence time information of the corresponding communication service mode, and reference signal information of an adjacent cell.

Upon receipt of the broadcast channel information, the silence time determiner 615 determines if the current interval is a silence time. When it is determined that the current interval is a silence time, the communication service mode's expected performance estimator 620 shifts to the frequency allocated to the corresponding communication service mode, performs correlation using a reference signal of the corresponding frequency, and then estimates expected performance. Here, the reference signal can be either a different value for each corresponding communication service mode, or the same value regardless of the corresponding communication service mode.

The best 'serving BS'—'communication service mode' combination determiner 625 operates in two steps. In the first step, the best 'serving BS'—'communication service mode' combination determiner 625 selects the best BS for each communication service mode, and estimates the expected performance. In the second step, the best 'serving BS'—'communication service mode' combination determiner 625 searches for a best combination of the serving BS among the selected best BSs for each of the communication service modes and the communication service mode, and the second step undergoes the following detailed process.

The best 'serving BS'—'communication service mode' combination determiner 625 receives the estimated SNRs for each of the communication service modes, and determines the best 'serving BS'—'communication service mode' combination according to a communication service mode decision criterion for each user, using the Equation (1).

Herein, $ID_{opt_u}$ and $mode_{opt_u}$ denote a cell ID of the best combination of a 'serving BS' and a 'communication service mode' for a $u^{th}$ user, respectively, and $f_u()$ denotes a decision criterion function for the $u^{th}$ user, with the items in ( ) used as factors. In addition, $SNR_{i,m}$ denotes a received SNR of a preamble corresponding to an $m^{th}$ communication service mode with an $i^{th}$ Cell ID, $R_u$ denotes a requested rate of the $u^{th}$ user, $S_u$ denotes a requested service type of the $u^{th}$ user, $v_u$ denotes a moving velocity of the $u^{th}$ user, and $C_u$ denotes a charge table for each communication service mode of the $u^{th}$ user.

After determining the best combination of the 'serving BS' and the 'communication service mode', when the current 'serving BS'—'communication service mode' combination is not the best 'serving BS'—'communication service mode' combination, the terminal 600 switches to the determined best 'serving BS'—'communication service mode' combination. When the current 'serving BS'—'communication service mode' combination is the best 'serving BS'—'communication service mode' combination, the terminal 600 keeps the current 'serving BS'—'communication service mode' combination.

Thereafter, the terminal 600 acquires service mode information being periodically serviceable over a broadcast channel of the corresponding communication service mode, silence time information, and reference signal information of an adjacent cell, and sets the best 'serving BS'—'communication service mode' combination.

In summary, the terminal of the present invention sets up a connection with the broadcast channel, acquires, from the broadcast channel, information on the communication service mode where the service is available, silence time information of the corresponding service, and reference signal information of an adjacent cell, compares a predetermined reference value with the expected performance for each of the communication service modes every silence time, and performs switching to the best 'serving BS'—'communication service mode' combination.

A second embodiment of the present invention transmits a reference signal for the case where the frequency originally allocated to a particular communication service mode is leased to be used in another communication service mode. For example, it is assumed that even though F4 is allocated to Moving Network, when there is no need to support Moving Network in the corresponding location, the F4 is leased to New Mobile 1 which is a communication service mode that needs support in the corresponding position.

A description will now be made of an exemplary design of preferred reference signal and broadcast channel for selection of the best combination by the user terminal according to the second embodiment of the present invention. In this case, the entire resource configuration is equal to that shown in FIG. 3. However, with use of a sequence of the reference signal shown in FIG. 7, it should be notified that the reference signal of F4 is used in place of a reference signal for New Mobile 1, rather than used as a reference signal for Broadcasting.

FIG. 7 illustrates an exemplary table in which sequences of reference signals for communication service modes are allocated for BSs according to the second embodiment of the present invention.

Referring to FIG. 7, to inform the terminal that the reference signal, instead of the existing reference signal used for the communication service mode, is used for another communication service mode, the second embodiment allocates different reference sequences for the communication service modes, and transmits the sequence mapped to the communication service mode of New Mobile 1 in a transmission interval for the reference signal of F4.

For example, for a service mode 2 of a BS 2, a sequence N+2 is allocated as a transmission interval of a reference signal for New Mobile 1, and a service mode N is assumed as a communication service mode of F4. In this case, when there is no need to support the communication service mode of New Mobile 1 in the corresponding position, the BS allocates a sequence N+2 of a reference signal for the New Mobile 1 instead of the reference signal sequence N of F4, and transmits it to the corresponding terminal.

When the same BS sequence values are used for F1 and F4, it is notified that the corresponding BS uses the reference signal of F4 as a reference signal sequence for New Mobile 1, in the broadcast channel providing the anchor communication service mode.

In summary, in the second embodiment of the present invention, a reference signal generator of the BS allocates different sequences for its supportable communication service modes. It is assumed that the terminal and the BS previously know the sequences allocated for the communication service modes. Therefore, the reference signal receiver of the corresponding terminal can determine which communication service mode the sequence received from the BS supports. Operations of the elements except for the reference signal receiver of the terminal, shown in FIG. 6, and the reference signal generator of the BS, shown in FIG. 5, have been described above.

The present invention adaptively applies multiple RATs optimized for multiple communication service modes taken into consideration in the post-3G mobile communication system to allow each user to select the best 'serving BS'—'communication service mode' combination.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for receiving a signal of a Base Station (BS) providing multiple communication service modes in a communication system, the apparatus comprising:
    a reference signal receiver for receiving, from the BS, a reference signal for each of a first communication service mode for covering the entire service area of a corresponding cell and at least one second communication service mode for covering a partial area of the first communication service mode;
    a broadcast channel receiver for receiving broadcast channel information from a broadcast channel of the first communication service mode;
    a performance estimator, upon entering a network, for acquiring synchronization with an anchor communication service mode of the network, and performing cell search;
    a silence time determiner for setting up a connection with a broadcast channel of the first communication service mode, and determining if a current time position is a silence time interval for transmitting the reference signals and the broadcast channel information;
    a communication service mode's expected performance estimator for estimating expected performance of each service mode using the broadcast channel and the reference signal;
    a best 'serving BS' -'communication service mode' combination determiner for determining a best combination of a 'serving BS' and a 'communication service mode' using the expected performance of each communication service mode; and
    a broadcast channel receiver for receiving a reference signal of a second communication service mode in the silence time interval uniformly set for each frequency band of each communication service mode,
    wherein the broadcast channel information includes information on a combination of a BS, from which each user terminal can receive a service in a current position, and a communication service mode, and information on a combination of a BS of an adjacent cell and a communication service mode.

2. The apparatus of claim 1, wherein the reference signal is allocated one sequence for each BS to be reused regardless of the communication service mode, or is allocated multiple sequences for BSs so that different values are used for the corresponding communication service modes.

3. The apparatus of claim 1, wherein the communication service mode is mapped to a particular frequency region.

4. The apparatus of claim 1, wherein the best 'serving BS' -'communication service mode' combination determiner uses, as a reference value, an output value of a function, an input value of which includes at least one of a maximum received Signal-to-Noise Ratio (SNR) for each communication service mode, a requested rate of a user, a requested service type of the user, a moving velocity of the user, and a charge table for each communication service mode of the user.

5. The apparatus of claim 1, wherein the silence time interval is an interval in which a reference signal of another communication service mode is inserted in a partial interval of a frequency band of a corresponding communication service mode.

6. The apparatus of claim 1, wherein each frequency band corresponding to each of the multiple communication service modes is set to a same time interval, and comparison between adjacent BSs for each of the multiple communication service modes communicating in a corresponding frequency in the time interval are performed.

7. The apparatus of claim 1, wherein each of the communication service modes are mapped to a particular frequency region, and set an interval to use a partial interval of a first frequency unused by the first communication service mode as a frequency of the second communication service mode.

8. A method for receiving a signal of a Base Station (BS) providing multiple communication service modes in a communication system, the method comprising:
    receiving, from the BS, a reference signal for each of a first communication service mode for covering the entire service area of a corresponding cell and at least one second communication service mode for covering a partial area of the first communication service mode;
    receiving, from a broadcast channel of the first communication service mode, broadcast channel information including information on a combination of a BS, from which each user terminal can receive a service in a current position, and a communication service mode, and information on a combination of a BS of an adjacent cell and a communication service mode;
    upon entering a network, acquiring synchronization with an anchor communication service mode of the network, and performing cell search;
    setting up a connection with a broadcast channel of the first communication service mode, and determining if a current time position is a silence time interval for transmitting the reference signals and the broadcast channel information;
    estimating expected performance of each service mode using the broadcast channel and the reference signal; and determining a best combination of a 'serving BS' and a 'communication service mode' using the expected performance of each communication service mode.

9. The method of claim 8, wherein the reference signal is allocated one sequence for each BS to be reused regardless of the communication service mode, or is allocated multiple sequences for BSs so that different values are used for the corresponding communication service modes.

10. The method of claim 8, wherein determining a best combination of a 'serving BS' and a 'communication service mode' comprises:
using, as a reference value, an output value of a function, an input value of which includes at least one of a maximum received Signal-to-Noise Ratio (SNR) for each communication service mode, a requested rate of a user, a requested service type of the user, a moving velocity of the user, and a charge table for each communication service mode of the user.

11. The method of claim 8, wherein the silence time interval is an interval in which a reference signal of another communication service mode is received for each communication service mode for which a reference signal transmission time is set differently.

12. The method of claim 8, wherein the silence time interval is set uniformly for each communication service mode to make performance comparison between adjacent BSs that provide corresponding communication service modes.

13. The method of claim 8, wherein the communication service mode is mapped to a particular frequency region.

* * * * *